Figure 5:
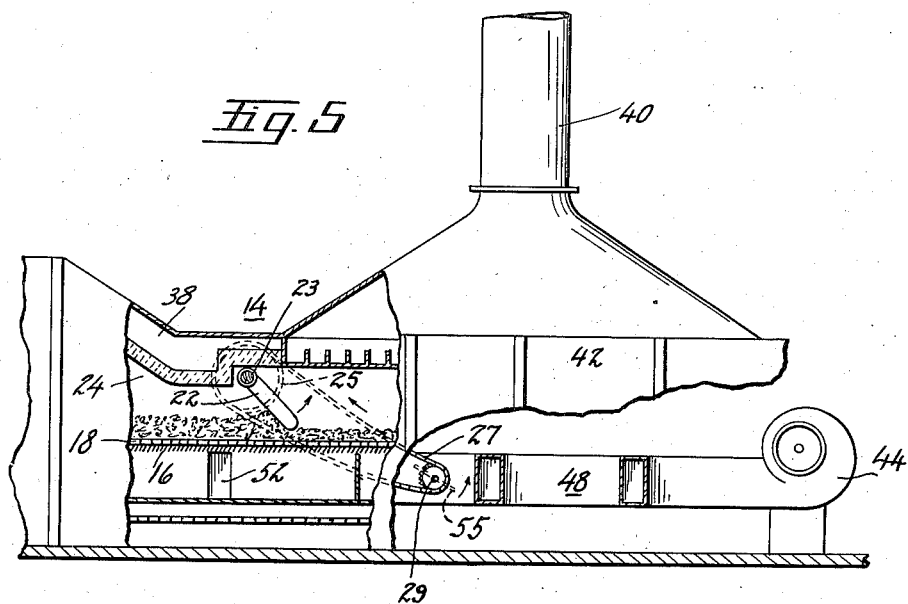

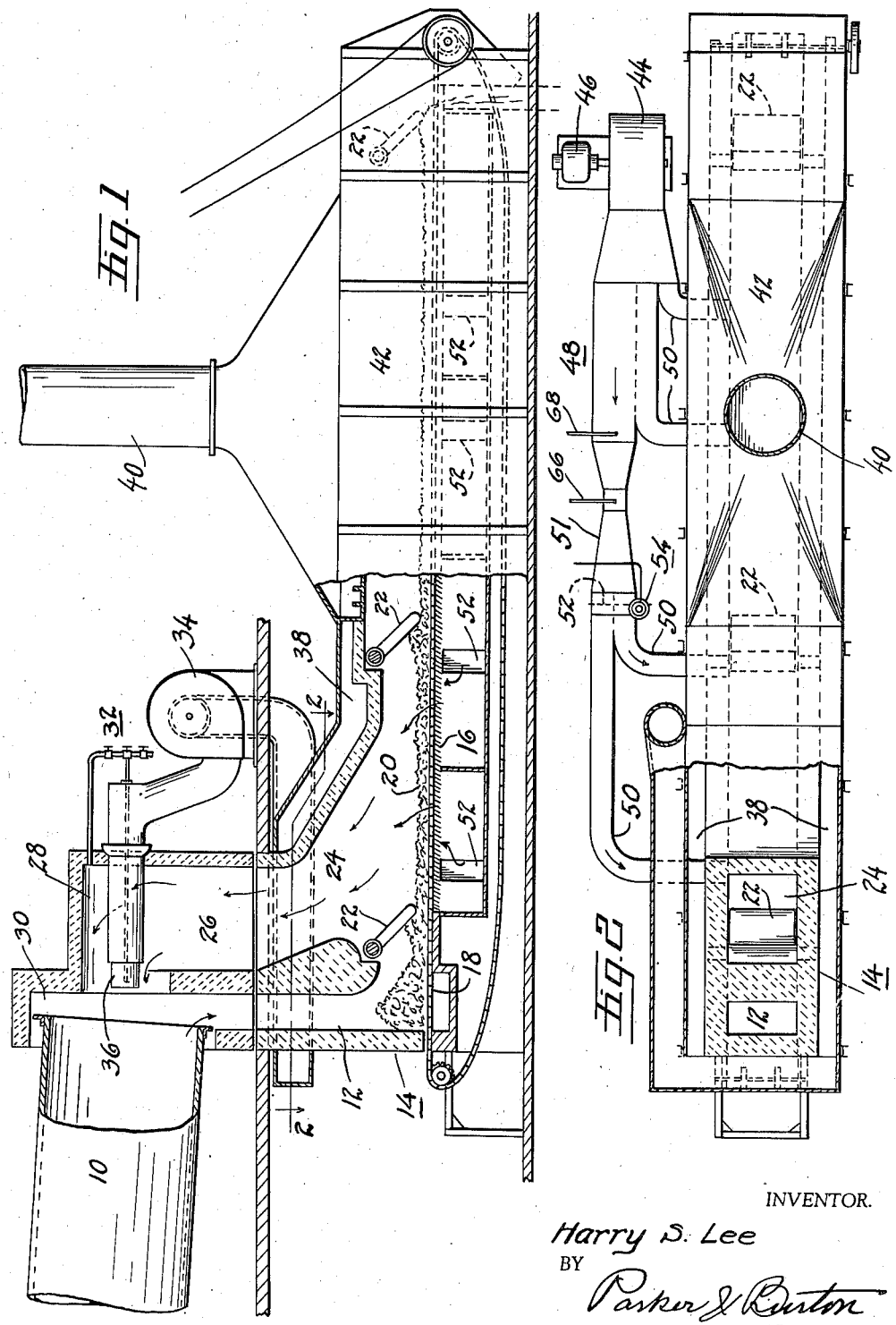

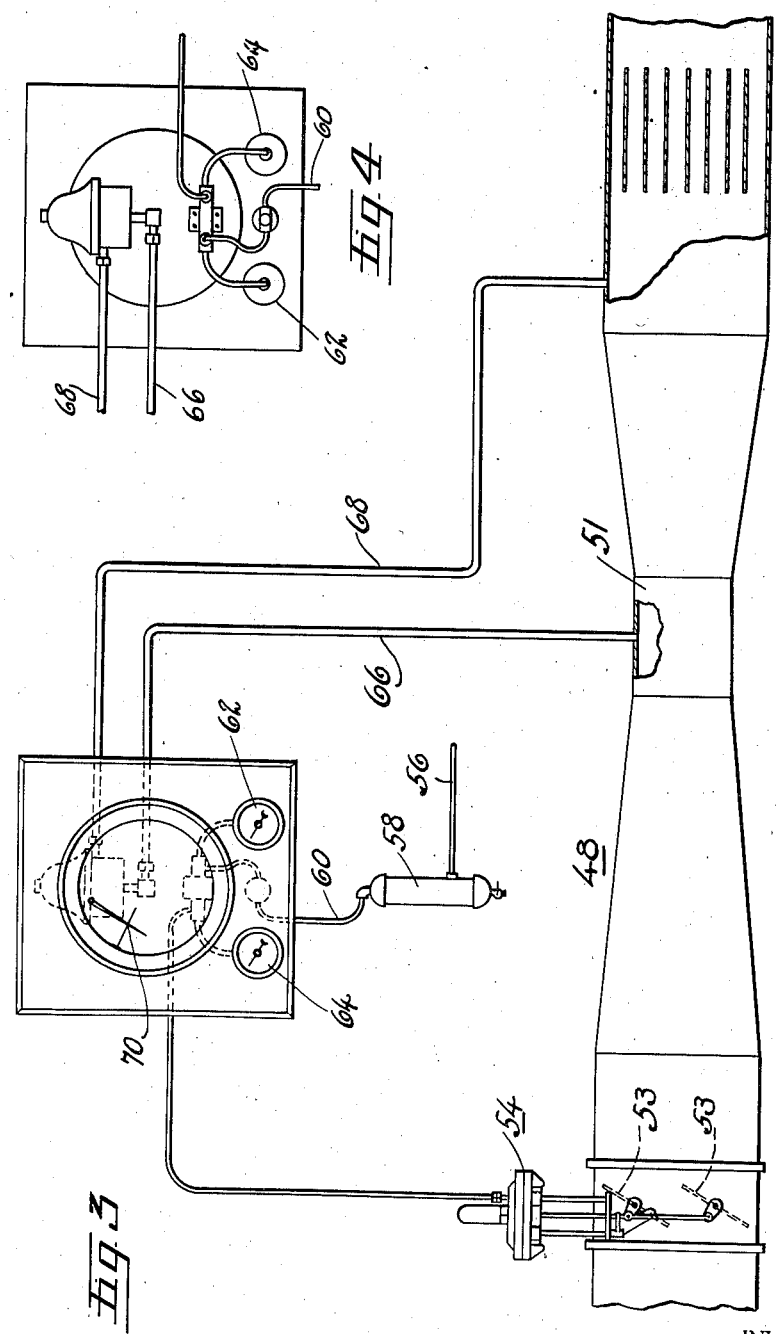

Oct. 12, 1937.  H. S. LEE  2,095,446
PROCESS OF AND APPARATUS FOR FORMING CEMENT CLINKER
Filed Aug. 29, 1935  4 Sheets-Sheet 4

INVENTOR.
Harry S. Lee
BY Parker & Burton
ATTORNEYS.

Patented Oct. 12, 1937

2,095,446

UNITED STATES PATENT OFFICE 2,095,446

PROCESS OF AND APPARATUS FOR FORMING CEMENT CLINKER

Harry S. Lee, Detroit, Mich.

Application August 29, 1935, Serial No. 38,382

12 Claims. (Cl. 263—32)

My invention relates to improvements in the process of and apparatus for forming cement clinker and particularly to that type of apparatus described in my application Serial No. 543,416, filed June 10, 1931, now Patent No. 2,012,881 wherein a clinker processing and cooling chamber is associated with a cement kiln and heated secondary air after passing through the clinker within the processing chamber is delivered to the kiln for combustion purposes.

An object is to so control the delivery of such heated secondary air as to volume and temperature that a predetermined volume of such secondary air at a predetermined temperature is delivered to the kiln at a uniform rate per unit of time whereby the combustion within the kiln is maintained at maximum efficiency.

It is understood that a cement kiln of determined capacity operating under prescribed conditions to produce a determined number of barrels per hour requires with a predetermined character of fuel a predetermined volume of air at a certain temperature to operate at its maximum efficiency. An increase or decrease in the volume of air will unbalance the combustion within the kiln.

Fuel is normally fed into the kiln by primary air, which primary air stream is uniform in volume for a given fuel delivery per unit of operating time. If the secondary air is delivered to the kiln from a recuperator a constant volume may be readily maintained. In the construction shown in my application above designated however, and to which this invention pertains this secondary air is not delivered from a recuperator but is air which has passed through the clinker bed that moves through the processing chamber.

This clinker bed varies in thickness from time to time because the discharge of clinker from the kiln is unequal in volume. In the operation of a kiln clinker will collect in rings in the kiln and a large volume will be discharged at one time and the discharge at another time will be relatively small. This inequality in volume of discharge produces an uneven thickness of bed of clinker advancing through the processing chamber. As the clinker bed increases in thickness the movement of air therethrough is obstructed and a less volume is permitted to pass through the bed than when the clinker bed is of less thickness. The clinker bed may also vary as to characteristic of coarseness or fineness of clinker constituting the bed. Relatively fine clinker being closely compacted will obstruct the flow of air therethrough to a far greater extent than a bed of coarse clinker having large voids between the clinker making up the bed.

In the operation of a cement kiln wherein the secondary air delivered thereto has passed through the bed of clinker advancing through the processing chamber and wherein variations in thickness of the clinker bed occur due to unavoidable variations in the volume of clinker discharged from the kiln during its functioning, and wherein such secondary air consequently varies substantially in volume delivered to the kiln per unit of time, such variation produces wide and undesirable variations from time to time in the degree to which the clinker is cooled and furthermore produces wide and undesirable variations in the functioning of the kiln due to the variation in volume of the secondary air delivered thereto.

It is an object of my invention to regulate and control the delivery of such secondary air to the kiln so that it is delivered thereto at a substantially uniform and constant rate regardless of variations in thickness in the moving clinker bed or variation in the characteristic of fineness of the clinker. Otherwise stated, I propose to cause a substantially uniform volume of air to pass through the clinker bed regardless of variation in obstruction, during the normal operation of the mechanism, offered by the bed of clinker to the passage of air therethrough.

I propose to accomplish this result by providing apparatus responsive to variations in thickness in the clinker bed or variations in the obstructing characteristic thereof which functions to increase or decrease the pressure of the air delivered to the processing chamber to pass through the bed. I deliver air under pressure to the processing chamber to pass through the clinker bed advancing through the chamber. This air is delivered to the processing chamber under such pressure that at the maximum thickness of the clinker bed or the maximum air passage obstructing factor, which will result from the usual operation of the kiln, sufficient air will pass through the bed to be delivered as secondary air to the kiln to maintain the maximum efficiency of operation of the kiln. I therefore provide mechanism which is responsive as a function of the air passage obstructing characteristic of the clinker bed to vary the pressure of the air delivered therethrough so that a substantially constant and uniform delivery of secondary air through the chamber is maintained by maintaining a substantially uniform and constant volume flow of air through the clinker bed regardless of variations in its thickness or density.

Figure 6:
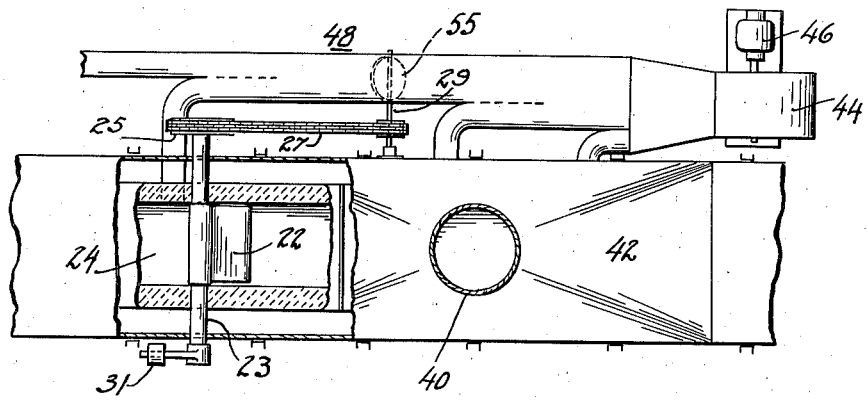
Figure 7:
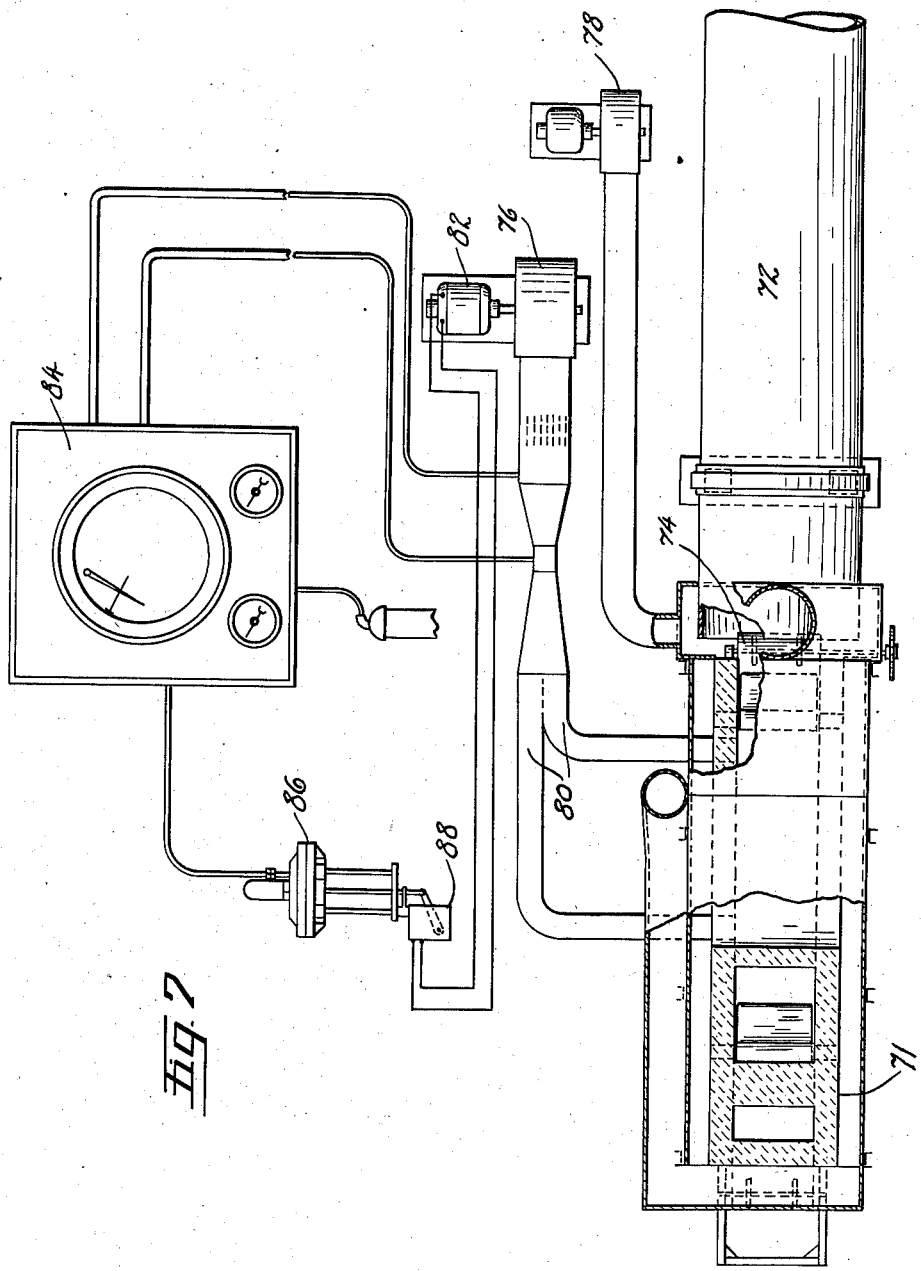

Various embodiments of my invention are illustrated for the accomplishment of the purpose outlined above and various advantages, meritorious features, and objects will further appear from the following description, appended claims, and accompanying drawings, wherein:

Figure 1 is an elevation of an apparatus embodying my invention partly broken away to illustrate the interior structure, Fig. 2 is a plan of the construction shown in Fig. 1 likewise partly broken away along the section line shown in Fig. 1 to show the interior, Fig. 3 is a diagram of a control mechanism, Fig. 4 is an enlarged elevation of a portion of a control member, Fig. 5 illustrates a modification of my invention in side elevation partly broken away, Fig. 6 is a plan of the construction shown in Fig. 5 and likewise partly broken away, and Fig. 7 illustrates another modification of my invention.

My invention relates to that type of cement manufacturing apparatus wherein the secondary air that is delivered to the kiln is air which has passed through the clinker bed as the bed moves through a processing or cooling chamber. In Fig. 1 I illustrate a type of structure which has gone into use and which is shown in earlier applications of mine and wherein there is a cement kiln 10 which delivers clinker through a clinker chute 12 into a processing chamber indicated generally as 14. This chamber is provided with a grate 16 over which a drag chain or other type of clinker conveyor 18 is adapted to advance the clinker in a moving bed indicated as 20. The chamber is divided into a plurality of compartments, two being here shown, which are isolated from the atmosphere and from each other by a series of swingable gates or valves 22. The forward chamber 24 communicates through conduit 26 with a mixing chamber 28 which discharges through the hood 30 into the kiln 10.

Fuel feed mechanism indicated generally as 32 is adapted to project suitable fuel, such as powdered coal, into the kiln. This fuel may be fed by primary air driven from a blower 34 through a pipe 36 into the kiln. This primary air may be controlled as a constant volume and may be taken from a recuperator jacket 38 arranged about the processing chamber. The chamber may be provided with a stack 40 which communicates with the compartment 42 for the discharge of cooling air as desired.

Air is fed into the processing chamber from a blower 44 driven by suitable power means such as an electric motor 46, which blower communicates with the manifold indicated generally as 48, which manifold is provided with a plurality of outlets 50 that communicate with the processing chamber underneath the grate through ports or discharge openings 52 to discharge air under pressure into the processing chamber underneath the grate to be driven through the gate and through the clinker bed. The structure heretofore described is illustrated in my other earlier applications and is shown here in connection with the embodiment of applicant's present invention, which invention relates to its mechanism for controlling the flow of air through the bed and its delivery as secondary air to the kiln.

As was stated in the object paragraphs, in this type of apparatus there is apt to be wide variation from time to time in the thickness or density of the clinker bed and as this bed imposes a resistance to the flow of air through the bed, such resistance will vary with the thickness or density of the bed and the volume of air passing therethrough. If a constant volume of air is delivered to the bed at a constant pressure the volume of air conveyed therefrom to the kiln will vary widely from time to time and will cause the combustion within the kiln to fluctuate widely. My invention relates to the provision of means adapted to insure the flow of a constant volume of air through the clinker bed into the combustion chamber as secondary air regardless of these variations in thickness of the bed or its density.

I provide in the intake manifold a Venturi portion 51 and an air volume control valve or valves 53 as indicated particularly in Fig. 3. These valves 53 are adapted to regulate the volume of air flowing through the conduit to the processing chamber. It is apparent that as the bed of clinker increases in thickness or density that the static pressure of the air in the manifold will rise due to the greater resistance offered to its flow through the bed and that as the bed decreases in thickness or density this static pressure of air will fall due to the greater velocity with which the air will flow through the bed.

The particular type of fan or blower 44 which I employ is one which, while conventional, is constructed particularly for this purpose and it is an unloading type of fan which will not overload the discharge. The fan, however, is of such a character that it is capable of delivering air at such pressure as to meet the requirements of combustion within the kiln at the normal maximum thickness of clinker bed or density which would result from the usual operation of the device.

The dampers 53 will regulate the volume of air delivered to the chamber as the density or thickness of the bed decreases from this maximum toward a minimum. These dampers are connected with a diaphragm motor indicated generally as 54 which is of a conventional construction and is adapted to open the valves as the pressure increases and to close the valves as such pressure diminishes. Control of this mechanism is provided by a conventional type of air control device. I have here shown one which is known on the market as the Foxboro air weight controller. A front view is shown in Fig. 3 of the panel. A rear view is shown in Fig. 4. An air line 56 communicates with a source of air pressure (not shown) and passes through a filter 58 and connection 60 to the Foxboro instrument. 62 is the air supply gauge and 64 is the valve motor gauge. The device communicates through line 66 with the interior of the manifold 48 at the venturi and through the line 68 with the interior of the manifold beyond the venturi so that it communicates with areas of different pressures and variations in static pressure of the air within the manifold are registered and cause the diaphragm motor 54 to open and close the dampers 53. The device is provided with an indicator 70 which is set to a determined pressure which it is desired to normally maintain under normal operating conditions and as the flow decreases and the static air pressure at the throat of the manifold rises the valves are opened to deliver a greater volume of air and to build up a greater pressure in the processing chamber to cause sufficient air to flow through the clinker bed to maintain a substantially uniform delivery to the kiln. As the static air pressure within the manifold falls, due to an increased flow caused by diminution in density or thickness of the clinker bed the valves close so as to decrease the volume of air delivered to the processing chamber. In this manner I am able to maintain a substantially constant flow of air through the processing chamber.

In the embodiment of my invention illustrated in Figs. 5 and 6 I have mechanically coupled one of the gates 22 which is swingably supported within the processing chamber and which bears upon the advancing bed of clinker with a valve indicated as 55 in the manifold 48. It will be understood that this fragmentary view illustrates the construction shown in Figs. 1 and 2 except that instead of the venturi and flow meter arrangement operating the air volume valves through the diaphragm motor, I have coupled the air volume air valve directly with the gate 22 so that as the gate rises due to increase in thickness of the bed the valve 55 is open. As the gate falls due to decreased thickness in the bed the valve 55 tends to close. This structure is made dependent in its operation purely upon variation in thickness of the bed of clinker and does not respond to variations due to increase or decrease in density. The structure in these Figs. 5 and 6 is otherwise as has been described. The gate 22 has a shaft 23 which is extended and from one end of this shaft is mounted a sprocket 25 which, through a chain 27, drives a shaft 29 upon which the valve 55 is mounted. 31 is a counterweight upon the shaft 23 to hold the gate 22 against the bed of clinker and would be found also in the construction shown in Figs. 1 and 2.

In the embodiment of my invention illustrated in Fig. 7, I provide a conventional air control device, such as that shown in Figs. 3 and 4, for controlling the motor of the air fan or blower which supplies air to the processing chamber. This modification of the invention is shown in connection with a processing chamber 71 similar to that previously described and a rotary cooling chamber 72 which is slightly inclined. The conveyor 74 in the processing chamber carries the clinker through the chamber and drops the same into the rotary cooler through which it is advanced by reason of its inclined rotary movement.

Two fans or blowers 76 and 78 are employed to supply cooling air to the processing chamber 71 and the rotary cooler 72 respectively. The last mentioned blower may deliver air to the rotary cooler in any suitable way. Blower 76 is provided with a split air feed pipe 80 which delivers air to the processing chamber 70. Both air blowers are provided with motors for driving the same. The motor 82 for blower 76 is a variable speed motor and is controlled by an air control device 84 similar to that shown in Figs. 3 and 4. A diaphragm motor 86 is associated with the air control device and is coupled to a variable electric resistance 88. The variable resistor 88 forms part of the circuit for the motor 82.

The operation of this embodiment is readily perceived. As the clinker bed on the conveyor 74 increases in thickness it offers more resistance to the passage of air and less volume is therefore delivered from the processing chamber to the fuel burner. The air control device 84 is arranged to vary the resistor 88 and increase the speed of the motor for the purpose of delivering a greater volume of air. The reverse operation takes place when the thickness of the clinker bed decreases and an increased volume of air passes therethrough. In that event, the air control device acts to decrease the speed of the motor and lower the volume of air delivered through the conduit 80.

What I claim is:

1. In a clinker processing chamber, means for delivering heated clinker into the chamber, means for advancing the clinker as a moving bed through the chamber, an air delivery conduit leading into the chamber to deliver air thereinto to flow through said clinker bed, means for feeding air under pressure through said conduit, and mechanism responsive to variations in thickness in the bed of clinker to vary the pressure of air delivered through said conduit to the bed.

2. In a clinker processing chamber, means for delivering heated clinker into the chamber, means for advancing the clinker as a moving bed through the chamber, an air delivery conduit leading into the chamber to deliver air thereinto to flow through said clinker bed, means for feeding air under pressure through said conduit, and mechanism bearing upon said clinker bed and responsive to variations in thickness of the clinker bed to vary the pressure of the air delivered through the conduit to the bed to maintain a substantially uniform volume of air passing through said bed.

3. In a clinker processing chamber, means for feeding heated clinker into the chamber, means for advancing said clinker in a moving bed through the chamber, means including an air intake conduit for feeding a stream of air into the chamber and through said moving bed of clinker, said conduit provided with a control valve to regulate the volume of air permitted to flow thereby, and mechanism responsive to an increase or decrease in thickness in the clinker bed operable to actuate said control valve to increase or decrease the air permitted to flow thereby upon increase or decrease respectively in the thickness of the bed.

4. In a clinker processing chamber, means for feeding heated clinker into the chamber, means for advancing said clinker in a moving bed through the chamber, means including an air intake conduit for feeding a stream of air into the chamber and through said moving bed of clinker, said conduit provided with a control valve to regulate the volume of air permitted to flow thereby, and mechanism adapted to be actuated by an increase or decrease in thickness of the clinker bed operable to regulate said control valve to increase the volume of air permitted to flow thereby upon increase in thickness of the bed and to decrease the volume of air permitted to flow thereby upon decrease in the thickness of the bed.

5. In a clinker processing chamber, means for delivering heated clinker into the chamber, means for advancing the clinker as a moving bed through the chamber, an air delivery conduit leading to the chamber to deliver air thereinto to flow through said clinker bed, means for feeding air under pressure through said conduit, control means for regulating the pressure of the air delivered from the conduit into the chamber, mechanism responsive to variations in thickness of the moving bed of clinker connected with said control means to operate the same to increase the pressure of the air delivered from the conduit into the chamber upon increase in the thickness of the bed and to decrease the pressure of air delivered by the conduit into the chamber upon decrease in the thickness of the bed.

6. That method of operating a cement clinker processing chamber comprising delivering heated clinker into said chamber and advancing the same therethrough as a moving bed of clinker, delivering air under pressure into said chamber and causing the same to pass through the moving bed of clinker and be discharged from the chamber, and controlling the volume of air so discharged from the chamber regardless of variations in thickness or density of the bed of clinker advancing therethrough by varying the pressure upon the air delivered into the chamber to pass through the moving bed of clinker directly as the clinker bed varies in thickness or density.

7. That method of operating a cement clinker processing chamber comprising delivering heated clinker into the chamber in a volume and at a density which varies from time to time, advancing said clinker through the chamber as a moving bed, delivering air under pressure into said chamber and causing said air to pass through the moving bed of clinker and be discharged from the chamber, maintaining such a pressure on the air so delivered into the chamber as to cause a predetermined volume of air to pass through the bed of clinker at its maximum thickness or density, and controlling the pressure upon the air delivered into the chamber to pass through the clinker bed directly in response to variations in the air passage obstructing characteristic of the bed.

8. That method of operating a cement clinker processing chamber comprising delivering heated clinker into the chamber in a volume and at a density which varies from time to time, advancing said clinker through the chamber as a moving bed, delivering air under pressure into said chamber and causing said air to pass through the moving bed of clinker and be discharged from the chamber, maintaining such a pressure on the air so delivered into the chamber as to cause a predetermined volume of air to pass through the bed of clinker at its maximum thickness or density, interposing a control in the air stream entering the chamber over the volume of air permitted to flow thereby into the chamber, and causing said control to respond to variations in thickness or density in the clinker bed moving through the chamber to decrease the pressure of air permitted to enter the chamber as the clinker bed decreases in thickness or density.

9. In a clinker processing chamber, means for delivering heated clinker into the chamber, means for advancing the clinker as a moving bed through the chamber, an air delivery conduit leading to the chamber to deliver air thereinto to flow through said clinker bed, means for feeding air under pressure through said conduit, a member swingably supported within the chamber to ride over the clinker bed as it advances through the chamber, said member adapted to rise and fall respectively in response to an increase and decrease in thickness in the advancing clinker bed, a valve in said conduit adapted to regulate the flow of air therethrough to the chamber, and means coupling said swingably supported member with said valve to cause the valve to operate to admit an increased flow of air through the conduit upon swingable rise of the member and to cause the valve to operate to diminish the flow of air through said conduit upon swingable fall of the member.

10. In combination with a cement kiln adapted to receive cement clinker forming materials and to discharge heated cement clinker, a clinker processing chamber adapted to receive the clinker discharged from the kiln, means for advancing the clinker as a moving bed through the chamber, an air delivery conduit leading to the chamber to deliver air thereinto to flow through said clinker bed, means for feeding air under pressure through said conduit, said means being operable to vary pressure upon said air, mechanism responsive to variations in the volume of air flowing through the conduit into the chamber adapted to operate said air pressure feeding means to increase the pressure upon the air flowing through the conduit into the chamber as the flow of air through said conduit diminishes in volume to decrease the pressure upon the air flowing through the conduit into the chamber as the flow of air through said conduit increases in volume, and means for conducting air heated within said chamber to said kiln.

11. That method of controlling the delivery of secondary air for the combustion zone of a cement clinker manufacturing apparatus including a rotary kiln and a processing cooling into which the kiln discharges heated cement clinker in varying unpredictable quantities which comprises advancing cement clinker so received from the kiln through said processing cooling chamber as a hot moving bed of non-uniform thickness and density, delivering air under pressure to said bed and causing said air to pass through the bed to receive heat therefrom, conveying said air after it has become heated by the clinker bed from said chamber and delivering the same to said combustion zone as secondary air, and maintaining a constant volume of said secondary air for the combustion zone irrespective of the non-uniform character of said clinker bed by varying the pressure of the air delivered to said bed directly in accordance with the variable resistance encountered by the air in passing through the bed.

12. That method of controlling the volume of secondary air delivered to the fuel burner of a cement clinker kiln which comprises passing said air under pressure through a moving bed of highly heated cement clinker of non-uniform thickness and density and of varying resistance to the passage of air therethrough, and delivering a constant and uniform volume of secondary air to the burner regardless of the non-uniformity of the moving clinker bed by varying the pressure of the secondary air prior to its passage through said clinker bed directly in proportion to the resistance of said clinker bed to the passage of the air therethrough.

HARRY S. LEE.